United States Patent
Urai

[11] 3,922,029
[45] Nov. 25, 1975

[54] SEAT MOUNTING DEVICE FOR VEHICLE

[75] Inventor: Muneharu Urai, Higashiyamato, Japan

[73] Assignee: Takeji Saito, Toyko, Japan

[22] Filed: Apr. 10, 1974

[21] Appl. No.: 459,554

[30] Foreign Application Priority Data
Apr. 20, 1973 Japan.............................. 48-44097
Apr. 23, 1973 Japan........................ 48-47422[U]

[52] U.S. Cl................. 296/65 A; 248/429; 297/344
[51] Int. Cl.².......................................... B60N 1/08
[58] Field of Search................ 296/65 R, 65 A, 63; 297/216, 344; 248/429, 430; 244/122 R

[56] References Cited
UNITED STATES PATENTS
2,014,553  9/1935  Browne............................... 297/344
2,606,727  8/1952  De Haven........................... 297/216
3,507,472  4/1970  Agee et al........................... 297/216

FOREIGN PATENTS OR APPLICATIONS
260,751  11/1926  United Kingdom............... 296/65 R Primary Examiner—Robert J. Spar
Assistant Examiner—Donald W. Underwood
Attorney, Agent, or Firm—Oldham & Oldham Co.

[57] ABSTRACT

In a seat consisting of at least a sitting portion and a back rest portion for use in a vehicle, a device of simple construction is provided for adjustably securing the upper part of the back rest portion to the ceiling of the vehicle body so as to increase the seat holding force, hence to alleviate the shock imparted to the human body in the event of a collision accident.

5 Claims, 7 Drawing Figures

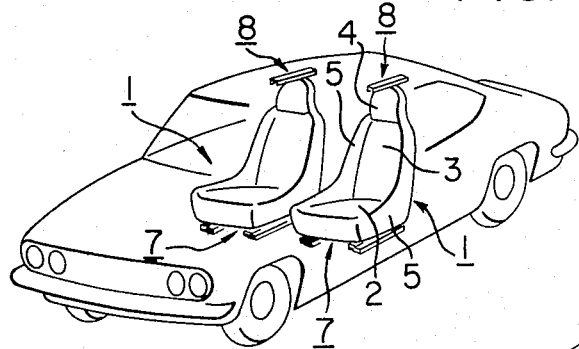
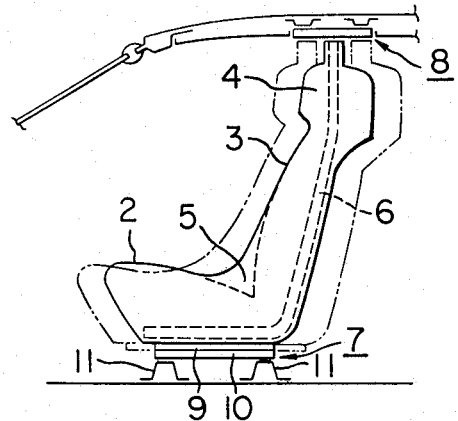
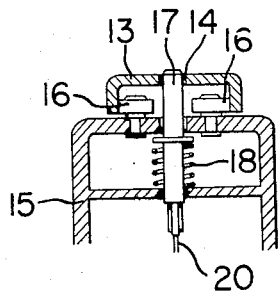
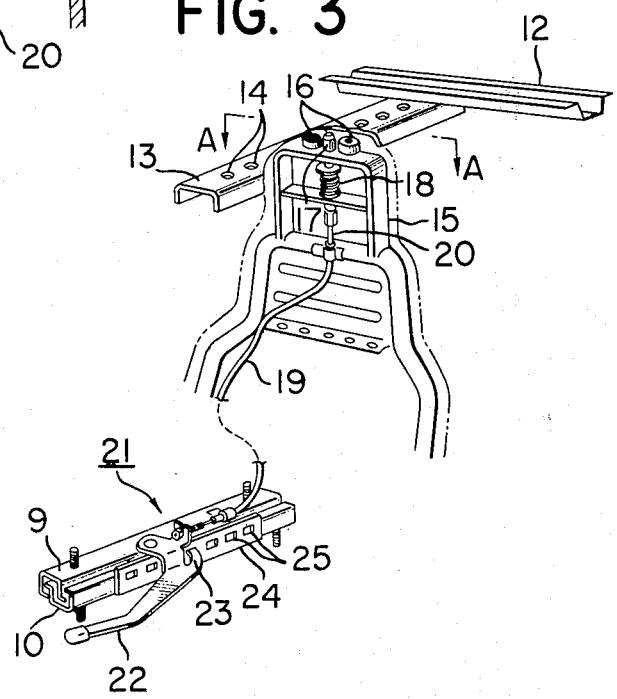

SEAT MOUNTING DEVICE FOR VEHICLE

This invention relates to a device for mounting a seat to the body of a vehicle.

Various devices and methods have been proposed hitherto for the purpose of ensuring the safety of passengers in a running vehicle. Means such as a safety belt or air bag has been proposed in an effort to protect the body of a passenger sitting on a seat in a running vehicle against the shock imparted to the body of the passenger in the event of a collision accident. In spite of the provision of such a means, the passenger has frequently suffered damage in the case of an actual collision due to breakage of the seat itself, especially breakage of the parts mounting the seat to the vehicle body or the parts connecting the back rest portion to the sitting portion of the seat. In many cases, a seat commonly conventionally used in a vehicle has been secured at a lower part or legs thereof to the floor surface of the vehicle so as to be slidable in the longitudinal direction of the vehicle, and the back rest portion of the seat has been secured at the lower end thereof to the sitting portion of the seat. Because of such a manner of mounting, abrupt impartation of a concentrated load to the seat due to, for example, a collision has tended to give rise to breakdown of the parts mounting the seat to the floor surface of the vehicle resulting in detachment of the seat from the floor surface of the vehicle or breakage of the parts mounting the back rest portion to the sitting portion of the seat. Especially, when the seat is of the reclining type, there has been a great tendency toward breakage of the parts swingably mounting the back rest portion to the sitting portion of the seat resulting in disengagement of this back rest portion from the sitting portion of the seat, due to the fact that the force holding the back rest portion in position is relatively weak.

At present, especially great importance is placed on the safety of passengers in vehicles. However, a prior attempt to provide stronger parts than heretofore for more securely mounting the seat to the floor surface of the vehicle or mounting the back rest portion to the sitting portion of the seat has resulted in the defects that these mounting parts occupy a very large space thereby hindering the passengers from smoothly getting in and out of the vehicle and the weight of these parts is increased to an extent which is no more suitable for installation in the vehicle for which a light weight is demanded.

With a view to obviate the defects of the prior art seat mounting device for vehicles above pointed out, it is an object of the present invention to provide a novel and improved seat mounting device for a vehicle in which the back rest portion of the seat is adjustably secured at the upper end thereof to the ceiling of the vehicle body so as to reinforce the force holding the seat itself against a shock imparted thereto as by a collision.

Another object of the present invention is to provide a seat mounting device of the above character in which means are provided to allow for sliding movement of the seat itself in the longitudinal direction of the vehicle so that the seat can be moved to any desired position which is considered most suitable for a passenger.

Still another object of the present invention is to provide a seat mounting device of the above character in which the back rest portion of the seat is suspended at the upper end thereof from the ceiling of the vehicle body so as to prevent disengagement of the back rest portion from the sitting portion in the event of a collision accident.

Yet another object of the present invention is to provide a seat mounting device of the above character in which the back rest portion of the seat can be tilted in any desired reclining position.

In accordance with one aspect of the present invention, there is provided a device for use in a vehicle for mounting a seat consisting of at least a sitting portion and a back rest portion comprising means for adjustably securing the upper part of said back rest portion of said seat to the ceiling of the vehicle body.

In accordance with another aspect of the present invention, there is provided a device for use in a vehicle for mounting a seat consisting of at least a sitting portion and a back rest portion comprising means for slidably mounting said sitting portion of said seat on the floor surface of the vehicle body, first locking means for locking said sitting portion of said seat against sliding movement relative to the vehicle body, an extension extending upward from the upper end of said back rest portion of said seat, means for adjustably securing said extension to the ceiling of the vehicle body so as to permit sliding movement of said extension relative to the ceiling, second locking means for locking said extension against movement relative to the vehicle body, and interlocking means for causing interlocking operation of said first and second locking means.

In accordance with still another aspect of the present invention, there is provided a device for use in a vehicle for mounting a seat consisting of at least a sitting portion and a reclining back rest portion comprising at least one interconnecting bar means of adjustable length pivoted at one end thereof to the ceiling of the vehicle body and at the other end thereof to the upper part of said back rest portion of said seat so that said back rest portion of said seat can be adjustably suspended at the upper part thereof from the ceiling of the vehicle body.

The above and other objects, features and advantages of the present invention will become apparent from the following detailed description of preferred embodiments thereof taken in conjunction with the accompanying drawings, in which:

FIG. 1 is a schematic view showing an application of an embodiment of the seat mounting device of the present invention to an automobile;

FIG. 2 is a schematic side elevation of parts of FIG. 1,

FIG. 3 is a perspective view of parts of the seat mounting device;

FIG. 4 is a section taken on the line A—A in FIG. 3;

Figure 5:
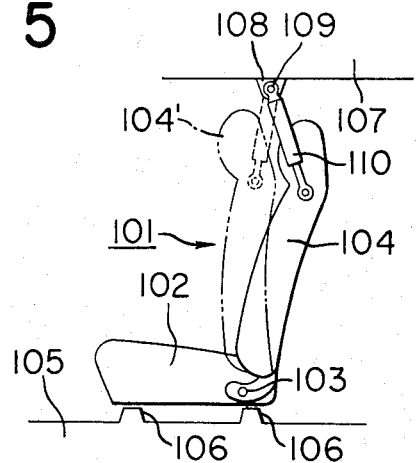
FIG. 5 is a schematic side elevation of another embodiment of the present invention.

Referring to FIGS. 1 and 2, two seats 1 are shown mounted in a vehicle. In the form shown in FIGS. 1 and 2, each seat 1 is of the type which is composed of an integral structure of a sitting portion 2, a back rest portion 3, a head rest portion 4 and a pair of side portions 5. As shown in FIG. 2, a substantially L-shaped frame member 6 is used in the seat 1 of integral structure to reinforce same, and the side portions 5 act as an additional reinforcing means to prevent movement of the back rest portion 3 relative to the sitting portion 2.

The seat 1 having such a structure is firmly but adjustably secured to the vehicle body by a mounting device which is composed of a lower mounting unit 7 and an upper mounting unit 8. In FIGS. 1 and 2, the lower mounting unit 7 is shown of the type commonly widely used in the art. This lower mounting unit 7 is composed of a pair of sliders 9 secured to the lower surface of the sitting portion 2 of the seat 1, a pair of channel-shaped guide members 10 secured to the floor surface of the vehicle body through legs 11 so as to guide sliding movement of the respective sliders 9, and locking means as shown in FIG. 3 for maintaining the sliders 9 in a desired position and locking same against sliding movement relative to the channel-shaped guide members 10.

The upper mounting unit 8 will be described in detail with reference to FIGS. 3 and 4. Referring to FIGS. 3 and 4, a guide member 13 is secured at opposite ends thereof to roof bows 12 at the ceiling of the vehicle body and extends in the longitudinal direction of the vehicle body. This guide member 13 is bent downward at opposite sides thereof so that it has a substantially U-like configuration, and a plurality of equally spaced apertures 14 are bored along the center line of the body portion thereof. The distance between these apertures 14 is selected to be equal to the distance between apertures in the locking means of the lower mounting unit 7 described later. A pair of rollers 16 are mounted on the upper end of an upward extension 15 of the head rest portion 4 of the seat 1 so as to make rolling engagement with the inner walls of the flanges of the guide member 13. A pin 17 projects upward through the extension 15 at a position intermediate between the rollers 16 and is engageable with one of the apertures 14 of the guide member 13 so as to lock the seat 1 against sliding movement. This pin 17 is normally urged in the locking direction by a biasing spring 18, but it can be disengaged from the aperture 14 against the force of the spring 18 when a core wire 20 of a cable 19 connected at one end thereof to the lower end of the pin 17 is pulled downward by a passenger sitting on the seat 1. The relation among the elements constituting the upper mounting unit 8 is clearly shown in FIG. 4.

One form of the lower mounting unit 7 is shown at the lower part of FIG. 3, and one of the sliders 9 and one of the channel-shaped guide members 10 are shown detached from the seat and floor surface of the vehicle body. The locking means generally designated by the reference numeral 21 comprises a locking lever 22 pivoted to the slider 9 and a plate member 24 secured to the channel-shaped guide member 10. The locking lever 22 is provided with a pawl 23 which is selectively engageable with one of a plurality of equally spaced apertures 25 bored in the plate member 24. The other end of the core wire 20 of the cable 19 is securely connected to a suitable portion of the lever 22 so that the pin 17 can be urged away from the engaging aperture 14 of the guide member 13 in interlocking relation with the manipulation of the lever 22. Although the lever 22 is arranged to be normally urged toward the locking position through the core wire 20 by the force of the spring 18, another spring (not shown) may be provided so as to directly urge the lever 22 toward the locking position.

The operation of the seat mounting device shown in FIGS. 1 to 4 will now be briefly described. When it is desired to change the position of the seat 1, the lever 22 is gripped by hand and is swung in the lateral direction or unlocking direction in a conventional manner so as to disengage the pawl 23 of the lever 22 from the engaging aperture 25 of the plate member 24, and at the same time, to disengage the pin 17 from the engaging aperture 14 of the guide member 13 through the cable 19. Then, the entire seat 1 is moved in the longitudinal direction of the vehicle until the seat 1 occupies the desired position, and the gripping force imparted to the lever 22 is released. The lever 22 is urged in the locking direction by the force of the spring 18 to return to the original position again, with the result that the pawl 23 of the lever 22 engages the corresponding aperture 25 of the plate member 24 and the pin 17 engages the corresponding aperture 14 of the guide member 13. Thus, the seat 1 is secured to the vehicle body again at a position different from the previous position.

When the pawl 23 of the lever 22 fails to engage the desired aperture 25 of the plate member 24 and contacts the portion of the plate member 24 intermediate between the spaced apertures 25 or when the pin 17 fails to engage the desired aperture 14 of the plate member 13 and contacts the portion intermediate between the spaced apertures 14 of the plate member 13, the seat 1 may be slided slightly in the longitudinal direction of the vehicle body while leaving the lever 22 in the released state, so as to attain the desired engagement between the pawl 23 and the aperture 25 and between the pin 17 and the aperture 14. The new position of the seat 1 due to sliding movement in the longitudinal direction of the vehicle body is shown by the imaginary lines in FIG. 2.

According to this embodiment of the seat mounting device of the present invention, the seat is secured to the body of the vehicle at the lower part of the sitting portion and at the upper part of the back rest portion. Thus, the illustrated embodiment is advantageous in that the seat can be firmly held to the vehicle body against a concentrated load which may be imparted due to, for example, a collision accident, and serious damage due to breakage or detachment of the seat itself can be reliably prevented.

In a prior art seat structure for vehicles, the seat has been very weak against a force imparted to the upper part of the back rest portion in the longitudinal direction of the vehicle body due to the fact that the back rest portion is generally only supported at the lower part thereof. In the illustrated embodiment of the present invention, the back rest portion has a very large strength against a force imparted thereto in the longitudinal direction of the vehicle body due to the fact that the back rest portion is supported at both the upper part and the lower part thereof. Further, the illustrated embodiment is advantageous in that the seat itself can be slided in the longitudinal direction of the vehicle body so that it can be situated at a most suitable position for the occupant.

Various changes and modifications may be made in the structure and arrangement of the embodiment above described. For example, the present invention can be applied to a seat of the so-called low back type which is not provided with a head rest portion or in which such head rest portion is separately mounted, although the embodiment has referred to a seat of the so-called high back type in which a head rest portion is fixed integrally to a back rest portion. Further, the apertures 25 may be bored directly in the channel-shaped guide member 10 to eliminate the need for provision of the plate member 24.

FIG. 5 shows schematically another embodiment of the present invention. Referring to FIG. 5, a seat 101 is secured at a lower part of a sitting portion 102 thereof directly to the floor surface 105 of the body of a vehicle through a plurality of legs 106. A back rest portion 104 of the seat 101 is pivoted at a lower extension thereof to the sitting portion 102 by a pivot 103 fixed in the rear part of the sitting portion 102, so that the back rest portion 104 can make so-called reclining movement. In FIG. 5, the seat 101 is shown of the so-called high back type in which a head rest portion 104' forms an integral part of the back rest portion 104. However, the seat 101 may be of the so-called low back type which is not provided with such head rest portion or in which such head rest portion is separately mounted.

A connecting bar means of adjustable length is provided for suspending the upper part of the back rest portion 104 of the seat 101 from the ceiling 107 of the vehicle body. In the embodiment shown in FIG. 5, this connecting bar means is in the form of a hydraulic piston-cylinder unit 110 which is pivoted at one end thereof to the upper part of one side of the back rest portion 104 by a pin 111 and at the other end thereof to the ceiling 107 of the vehicle body by a pin 109 fixed in a bracket 108. Although only one hydraulic piston-cylinder unit 110 is provided for one of the sides of the back rest portion 104 in FIG. 5, a pair of such hydraulic piston-cylinder units may be provided to connect the respective sides of the back rest portion 104 to the ceiling of the vehicle body or a single hydraulic piston-cylinder unit may be provided to connect the central part of the back rest portion 104 to the ceiling of the vehicle body.

This hydraulic piston-cylinder unit 110 is of the closed type and the two pressure chambers defined within the cylinder by the piston communicate with each other through a valve and a communication conduit (not shown). The communication conduit having the valve thereon may be directly mounted on the hydraulic piston-cylinder unit 110 or may be suitably extended to be mounted to a part of the vehicle body or seat.

The operation of the seat mounting device shown in FIG. 5 will now be described. When it is desired to change the inclination of the back rest portion 104 of the seat 101, the valve (not shown) is opened to permit communication between the two pressure chambers within the cylinder. Then, when the back rest portion 104 is caused to swing to a desired position of inclination as shown by the imaginary lines in FIG. 5, the fluid under pressure in one of the two pressure chambers within the cylinder flows into the other by way of the valve and communication conduit with the swinging movement of the back rest portion 104. The valve is closed when the back rest portion 104 is swung to the desired position. The flow of the fluid under pressure between the two pressure chambers within the cylinder is interrupted and the back rest portion 104 is maintained in the desired position. In this manner, reclining of the back rest portion 104 can be easily carried out.

The embodiment shown in FIG. 5 is effective in that not only collapse or detachment of the back rest portion 104 due to a concentrated load imparted thereto in the event of, for example, a collision accident can be reliably prevented, but also the hydraulic piston-cylinder unit 110 acts to alleviate the shock imparted to the back rest portion 104. This is very preferable from the viewpoint of protection of the human body against the shock imparted due to a collision.

In the embodiment shown in FIG. 5, a spring for normally urging the back rest portion 104 in the forward direction is preferably mounted on the pivot 103 so that the back rest portion 104 can be moved in the forward direction only by the action of the valve associated with the hydraulic piston-cylinder unit when it is desired to cause reclining movement of the back rest portion 104 in the forward direction. Further, various changes and modifications may be made in the structure and arrangement of the device shown in FIG. 5. For example, the hydraulic piston-cylinder unit may be replaced by a pneumatic piston-cylinder unit or any other suitable connecting bar means of adjustable length.

A connecting bar means having a so-called Cheston's locking unit is an example in which axial movement of a locking sleeve (having a tapered inner surface and mounted on a tubular shaft) releases the gripping of a locking collet (mounted in the locking sleeve and having a tapered outer surface engageable with the tapered inner surface of the locking sleeve and teeth engageable with an another shaft inserted in the tubular shaft) to allow the relative movement of the two shafts. The locking sleeve is urged toward its locking position by a return spring mounted between the locking sleeve and the tubular shaft.

In the embodiment shown in FIG. 5, the pin 109 or 111 may be removed when it is desired to swing the back rest portion 104 to the fully reclined position.

Figure 6:
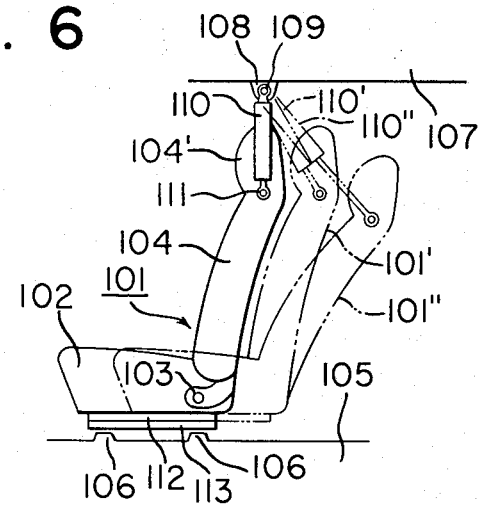
FIG. 6 is a schematic side elevation of a modification of the embodiment shown in FIG. 5.

FIG. 6 shows a modification of the embodiment shown in FIG. 5, in which means are provided to permit adjustment of the position of the sitting portion of the seat in the longitudinal direction of the vehicle body. Referring to FIG. 6, a pair of sliders 112 are secured to a lower part of the sitting portion 102 of the seat 101 and a pair of channel-shaped guide members 113 are secured to the floor surface 105 of the vehicle body through a plurality of legs 106 so that the sliders 112 can make sliding movement in the channel of the respective guide members 113. Locking means (not shown) is provided for maintaining the sliders 112 in a desired position and locking same against sliding movement relative to the guide members 113. The operation of the device shown in FIG. 6 is similar to that described with reference to FIG. 5.

The imaginary lines 101' and 110' in FIG. 6 represent the state of the seat 101 and the state of the hydraulic piston-cylinder unit 110 respectively when the entire seat 101 is slided in the backward direction from the position shown by the solid lines. The imaginary lines 101'' and 110'' represent the state of the seat 101 and the state of the hydraulic piston-cylinder unit 110 respectively when the back rest portion 104 is subsequently reclined backward.

The locking means in the lower mounting unit including the sliders 112 and guide members 113 may be provided with a lever which is arranged for making interlocking operation with the lever of the valve associated with the hydraulic piston-cylinder unit 110 so that the position of the seat 101 in the longitudinal direction of the vehicle body can be adjusted by merely manipulating the lever of the locking means in the lower mounting unit. Further, the lower mounting unit may be actuated independently of the hydraulic piston-cylinder unit 110 so as to adjust the position of the seat 101 in the longitudinal direction of the vehicle body. The hydraulic piston-cylinder unit 110 may be singly actuated so as to cause reclining movement of the back rest portion 104 as in the embodiment shown in FIG. 5.

Figure 7:
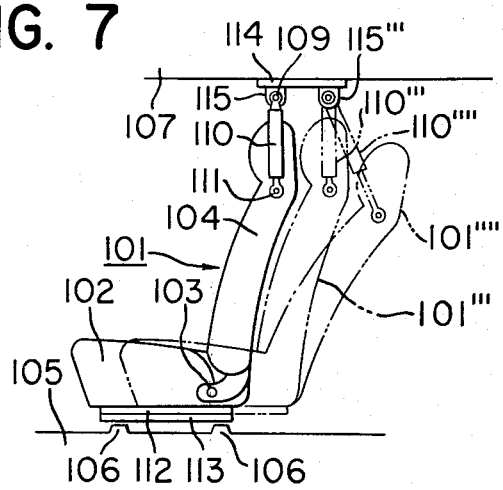
FIG. 7 is a schematic side elevation of a modification of the structure shown in FIG. 6.

FIG. 7 shows a modification of the device shown in FIG. 6. Referring to FIG. 7, the hydraulic piston-cylinder unit 110 is pivoted at the upper end thereof by a pin 109 to a movable member 115 which is slidable along a guide member 114 fixed to the ceiling 107 of the vehicle body. This movable member 115 is locked against sliding movement by a locking means (not shown) arranged for interlocking operation with the locking means in the lower mounting unit.

The imaginary lines 101''', 110''' and 115''' represent the state of the seat 101, the state of the hydraulic piston-cylinder unit 110 and the state of the movable member 115 respectively when the seat 101 is slided backward from the position shown by the solid lines. The imaginary lines 101'''' and 110'''' represent the state of the seat 101 and the state of the hydraulic piston-cylinder unit 110 respectively when the back rest portion 104 of the seat 101 is subsequently reclined backward.

The operation of the device shown in FIG. 7 is similar to that described with reference to FIGS. 5 and 6 except that the member 115 makes sliding movement along the guide member 114 and the hydraulic piston-cylinder unit 110 makes parallel movement or slight swinging movement during adjustment of the position of the seat in the longitudinal direction of the vehicle body.

In the device shown in FIG. 7, the sitting portion 102 of the seat 101 may be fixed in position by the lower mounting unit and the member 115 may be singly caused to slide along the guide member 114 so as to cause reclining movement of the back rest portion 104 although such movement is limited by the slidable range of the member 115. Then, the back rest portion 104 may be reclined more by extending the hydraulic piston-cylinder unit 110.

What is claimed is:

1. A device for use in a vehicle for mounting a seat consisting of at least a sitting portion and a back rest portion, comprising means for slidably mounting said sitting portion of said seat on the floor surface of the vehicle body, first locking means for locking said sitting portion of said seat against sliding movement relative to the vehicle body, an extension extending upward from the upper end of said back rest portion of said seat, means for adjustably securing said extension to the ceiling of the vehicle body so as to permit sliding movement of said extension relative to the ceiling, second locking means for locking said extension against movement relative to the ceiling, and interlocking means for causing interlocking operation of said first and second locking means.

2. A device as claimed in claim 1, wherein said means for slidably mounting said sitting portion on the floor surface of the vehicle body includes sliders secured to the lower part of said sitting portion and channel-shaped guide members supported on the floor surface by legs.

3. A device as claimed in claim 2, wherein said first locking means includes a plate member secured to one of said guide members and provided with a plurality of equally spaced apertures, and a lever pivoted to one of said sliders and having a pawl engageable with one of said apertures of said plate member when said aperture is brought to a position opposite to said pawl.

4. A device as claimed in claim 1, wherein said second locking means includes a substantially U-shaped guide member fixed to the ceiling of the vehicle body to extend in the longitudinal direction of the vehicle body and provided with a plurality of equally spaced apertures, a pair of rollers mounted on said extension for guiding sliding movement of said extension along the inner side walls of said guide member, a pin retractably projecting from said extension for engagement with one of said apertures of said guide member, and a spring normally urging said pin into engagement with one of said apertures of said guide member.

5. A device as claimed in claim 3 wherein said second locking means includes a lock member, and said interlocking means is a cable the core wire of which is connected at one end thereof to said lever and at the other end thereof to the lock member of said second locking means.

* * * * *